(12) United States Patent
Eidloth et al.

(10) Patent No.: US 11,460,075 B2
(45) Date of Patent: Oct. 4, 2022

(54) METHOD AND DEVICE FOR FITTING AN ANGULAR CONTACT ROLLER BEARING

(71) Applicant: Schaeffler Technologies AG & Co. KG, Herzogenaurach (DE)

(72) Inventors: Rainer Eidloth, Herzogenaurach (DE);
Reinhard Rumpel, Hottendorf (DE);
Ernst Geiger, Hallerndorf (DE);
Heinrich Hofmann, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 857 days.

(21) Appl. No.: 16/322,692

(22) PCT Filed: Jun. 19, 2017

(86) PCT No.: PCT/DE2017/100505
§ 371 (c)(1),
(2) Date: Feb. 1, 2019

(87) PCT Pub. No.: WO2018/024278
PCT Pub. Date: Feb. 8, 2018

(65) Prior Publication Data
US 2021/0372481 A1 Dec. 2, 2021

(30) Foreign Application Priority Data
Aug. 3, 2016 (DE) .......................... 102016214347.6

(51) Int. Cl.
*F16C 19/36* (2006.01)
*F16C 43/08* (2006.01)
(Continued)

(52) U.S. Cl.
CPC .............. *F16C 43/08* (2013.01); *F16C 19/36* (2013.01); *F16C 33/4605* (2013.01); *F16C 33/495* (2013.01)

(58) Field of Classification Search
CPC .... F16C 19/36; F16C 33/366; F16C 33/4605; F16C 33/494; F16C 33/585; F16C 33/64;
(Continued)

(56) References Cited

U.S. PATENT DOCUMENTS

| 1,212,253 A | 1/1917 | Perkins |
| 1,247,858 A | 11/1917 | Miller |

(Continued)

FOREIGN PATENT DOCUMENTS

| CH | 463886 | 11/1968 |
| CN | 101932841 A | 12/2010 |

(Continued)

*Primary Examiner* — Phillip A Johnson
(74) *Attorney, Agent, or Firm* — Volpe Koenig (57) ABSTRACT

A method and device for fitting an angular contact roller bearing, including an inner bearing ring having an inner race arranged on the outer peripheral surface of the inner bearing ring and inclined with respect to the axis of rotation of the bearing, and a rim delimiting said race at the smallest diameter thereof, an outer bearing ring having an outer race arranged on the inner peripheral surface of the outer bearing ring and inclined with respect to the axis of rotation of the bearing, and a rim delimiting said race at the greatest diameter thereof, and also including a plurality of roller bearing elements arranged between the bearing rings and roll on the races and are held at uniform distances from one another in the circumferential direction by a bearing cage. The outer peripheral surface of the inner bearing ring and the inner peripheral surface of the outer bearing ring are in each case cylindrical and extend outside the races at least in some sections coaxially with respect to the axis of rotation of the bearing, and the races of both bearing rings are in each case integrated conically into the cylindrical peripheral surfaces, such that the rims which are produced and in each case delimit the races on one side are in each case formed in one piece with the bearing rings. The fitting of the angular (Continued)

contact roller bearing takes place according to an eccentric pivot fitting method the deep groove ball bearing eccentric fitting method.

18 Claims, 8 Drawing Sheets

(51) Int. Cl.
*F16C 33/46* (2006.01)
*F16C 33/49* (2006.01)

(58) Field of Classification Search
CPC ...... F16C 43/06; F16C 43/08; Y10T 29/4968; Y10T 29/49682; Y10T 29/49684
See application file for complete search history.

(56) References Cited

U.S. PATENT DOCUMENTS

| | | | |
|---|---|---|---|
| 1,397,142 A | | 11/1921 | Palmgren |
| 1,418,277 A | * | 6/1922 | Birgh ............... F16C 43/06 384/552 |
| 1,545,841 A | | 7/1925 | Miller |
| 2,042,417 A | * | 5/1936 | Wise ................ F16C 33/495 384/571 |
| 2,633,627 A | * | 4/1953 | Olmstead ........... F16C 43/08 29/898.062 |
| 2,885,767 A | * | 5/1959 | Barish ............... F16C 43/08 29/898.062 |
| 3,420,589 A | | 1/1969 | Green et al. |
| 3,606,504 A | * | 9/1971 | Wojciechowski ...... F16C 19/40 384/551 |
| 3,783,482 A | * | 1/1974 | Kunert .............. F16C 19/06 29/898.062 |
| 4,425,009 A | | 1/1984 | Fillon et al. |
| 8,382,379 B2 | | 2/2013 | Doeppling et al. |
| 8,393,081 B2 | | 3/2013 | Doeppling et al. |
| 8,904,645 B2 | * | 12/2014 | Varnoux ............ F16C 43/08 29/898.062 |
| 9,429,194 B2 | | 8/2016 | Reimchen |
| 2009/0061736 A1 | * | 3/2009 | Uchino .............. B24B 1/04 451/28 |
| 2011/0026866 A1 | | 2/2011 | Doeppling et al. |

FOREIGN PATENT DOCUMENTS

| | | |
|---|---|---|
| CN | 102084145 A | 6/2011 |
| CN | 102449332 A | 5/2012 |
| CN | 102705370 A | 10/2012 |
| CN | 104246253 A | 12/2014 |
| DE | 168499 | 2/1903 |
| DE | 151483 | 5/1904 |
| DE | 344090 | 11/1921 |
| DE | 443593 A | 5/1927 |
| DE | 521398 | 3/1931 |
| DE | 6917609 | 9/1969 |
| DE | 2407477 | 8/1975 |
| DE | 3023811 | 1/1981 |
| DE | 3004672 A1 | 8/1981 |
| DE | 8713057 U1 | 12/1987 |
| DE | 102014200665 | 7/2015 |
| DE | 102014223708 A1 | 5/2016 |
| EP | 0057348 A1 | 8/1982 |
| WO | 2009121533 | 10/2009 |

* cited by examiner

Fig. 8 ns in manual
METHOD AND DEVICE FOR FITTING AN ANGULAR CONTACT ROLLER BEARING

The invention relates to a method for assembling an angular contact roller bearing, in particular a single-row angular contact roller bearing, which can be used to particular advantage to support the crankshaft in a motor-vehicle internal combustion engine. The invention furthermore relates to a device for assembling the angular contact roller bearing.

BACKGROUND

The type of bearing most often used to support the crankshaft in motor-vehicle internal combustion engines is the single-row deep groove ball bearing since this bearing is distinguished by an equally high radial and axial load capacity and has the highest rotational speed limits of all types of bearing because of its low friction. As is known, this deep groove ball bearing comprises an outer bearing ring, an inner bearing ring and a multiplicity of bearing balls, which are arranged between the bearing rings, roll in races in the form of grooves machined into the inside of the outer bearing ring and the outside of the inner bearing ring and are guided at uniform distances from one another by a bearing cage. In this case, the bearing balls are generally inserted into the deep groove ball bearing by the eccentric assembly method disclosed by DE 168 499 A1, in which the two bearing rings are arranged eccentrically relative to one another and the free space thereby formed between the bearing rings is filled with the bearing balls, after which the bearing rings are brought into a concentric position relative to one another by exploiting their elasticity and, after uniform circumferential distribution of the bearing balls, the bearing cage is inserted.

In practice, however, it has been found that deep groove ball bearings of this kind are always subject to certain limits, especially in respect of the radial load capacity of the bearing, due to the low maximum number of bearing balls that can be installed, this being dependent on the dimensions of the inner and the outer bearing ring and on the diameter of the bearing balls. In the past, therefore, a large number of solutions, e.g. an unclosed feed opening arranged in the opposite rims of the races of the outer and the inner bearing ring in accordance with DE 151 483 A1 or a closable feed opening of similar design in accordance with DE 24 07 477 A1, have been proposed, the intention being, by these openings, to achieve an increase in the radial load capacity of deep groove ball bearings by increasing the number of bearing balls, although they have not found acceptance in practice owing to the disadvantages resulting from such feed openings.

Another obvious way of increasing the load capacity of the bearing assembly for the crankshaft in a motor-vehicle internal combustion engine would be to replace the hitherto used deep groove ball bearing with a cylindrical roller bearing of the NUP type, such as that which is known from pages 393 and 396 of the rolling bearing catalogue of the applicant, dated October 2008. This cylindrical roller bearing has two lateral rims both on the inner bearing ring and on the outer bearing ring and is suitable for absorbing high radial loads and axial loads in both directions. However, due to the high proportion of machining involved, especially in the production of the races and the machining of the rims, cylindrical roller bearings of this kind have very high production costs and would, in turn, furthermore be over-dimensioned in terms of their load capacity, making them ultimately unsuitable for use as fixed bearings in manual transmissions of motor vehicles.

Another type of bearing, which is suitable for supporting the crankshaft in a motor-vehicle internal combustion engine, which forms the closest prior art to the present invention and the capacity of which for absorbing radial forces and axial forces in both directions is greater than that of deep groove ball bearings, has been disclosed by documents DE 6 917 609 U and CH 463 886 A. Each of these documents discloses an angular contact roller bearing which essentially comprises an inner bearing ring that has an inner race arranged obliquely to the radial bearing axis on the outer peripheral surface thereof and a rim delimiting said race at the smallest diameter thereof, further comprises an outer bearing ring that has an outer race likewise arranged obliquely to the radial bearing axis on the inner peripheral surface thereof and a rim delimiting said race at the largest diameter thereof, and further comprises a multiplicity of roller bearing elements that are arranged between the bearing rings, roll on the races thereof and are held at uniform distances from one another in the circumferential direction by a bearing cage. To enable the rolling elements, which are designed as taper rollers, to be inserted into the bearing cage, which is in each case designed as a pocket-type or window-type cage, the rim is formed as a separate component on the inner bearing ring in the angular contact roller bearing according to DE 6 917 609 U and as a separate component on the outer bearing ring in the angular contact roller bearing according to CH 463 886 A, being secured on the inner or outer bearing ring, respectively, after the assembly of the bearing. In the case of the angular contact roller bearing according to DE 6 917 609 U, this is accomplished by a separate slotted ring of U-shaped cross section, the radial legs of which engage in corresponding grooves in the rim and in the inner bearing ring, and, in the case of the angular contact roller bearing according to CH 463 886 A, it is accomplished by an encircling collar, which is formed integrally on the lower side of the rim and is pressed into the outer bearing ring.

Although, in the case of angular contact roller bearings of this kind, the fact that only one of the bearing rings is formed integrally with just one lateral rim means that the proportion of machining in the production of the races and the machining of the rims and hence also the overall costs for bearing manufacture are significantly lower than in the case of the cylindrical roller bearing described above, the formation of the rim on the other bearing ring as a separate rim disk, the additional installation thereof on this bearing ring and the required precision manufacture of the contact surfaces on these and on the associated bearing ring in the case of these angular contact roller bearings have an unfavorable effect on the production costs thereof. Moreover, there is the risk in the case of these angular contact roller bearings that the separate rim disk will not be sufficiently well secured to withstand high radial or axial load spikes, with the result that the rim disk may become detached during the operation of the bearing and ultimately the bearing may fail.

OBJECT OF THE INVENTION

Proceeding from the explained disadvantages of the solutions from the known prior art, it is therefore the underlying object of the invention to enable simple and low-cost assembly of an angular contact roller bearing, in particular a single-row angular contact roller bearing, with rims that delimit the race on one side in each case.

SUMMARY

According to the invention, this object is achieved by a method and a device having one or more features of the invention. Advantageous developments of the invention can be found in below and in the claims.

The method according to the invention is used to assemble an angular contact roller bearing in which, in each case outside the races, the outer peripheral surface of the inner bearing ring and the inner peripheral surface of the outer bearing ring are of cylindrical design, extending coaxially with respect to the bearing rotation axis, at least in some section or sections, and the races of both bearing rings are in each case machined conically into the peripheral surfaces, and in which the rims which are produced in this way and in each case delimit the races on one side are in each case formed in one piece with the bearing rings.

Provision is preferably made for the roller bearing elements preferably to be designed as taper rollers that have a taper angle in the range of 1° to 4° and roll on their races at an enveloping circle angle of 3° to 7°. When the angular contact roller bearing is used to support the crankshaft in a motor-vehicle internal combustion engine, a taper angle of 1.5° to 3°, but preferably of 2°, and an enveloping circle angle of between 5° and 6.5°, but preferably of 6°, have proven particularly suitable here owing to the radial and axial loads which occur. However, it should be noted that there is no intention to restrict the design according to the invention to a taper roller bearing since other roller bearings with roller axes arranged obliquely to the central axis of the bearing can be designed in the same way too. Thus, it is also possible to use cylindrical rollers or needles or rollers with spherical peripheral surfaces, such as self-aligning or barrel rollers, instead of the taper rollers presented by way of example.

It is furthermore advantageous that the gap between the outer peripheral surface of the inner bearing ring and the inner peripheral surface of the outer bearing ring is dimensioned in such a way that twice the dimension thereof is greater than the maximum diameter of the roller bearing elements. Such dimensioning of the gap between the inner and the outer bearing ring is necessary to enable the roller bearing elements to be inserted into the angular contact roller bearing by the assembly process described below.

It is furthermore advantageous to machine the rim delimiting the race in the inner bearing ring and the rim delimiting the race in the outer bearing ring with an equal minimum height of 18% to 22%, preferably about 20%, of the maximum diameter of the roller bearing elements. Such a design of the rims and the associated race depth ensures that high axial forces which occur during the operation of the bearing can be absorbed in one direction with a minimum possible rim friction while lower axial forces can be absorbed in the other direction via the oblique races.

An expedient development of the angular contact roller bearing envisages that, after the installation of the roller bearing elements, a prong-type cage comprising a cage ring and a multiplicity of axial cage webs is inserted into the angular contact roller bearing. On its cage webs, this bearing cage additionally has a plurality of latching webs distributed uniformly over the circumference, by which the bearing cage can be fixed axially in position on the inner surface of the rim on the outer bearing ring. Like the roller axes of the roller bearing elements, these latching webs are integrally formed on the cage webs and inclined with respect to the central axis of the bearing and, during the insertion of the bearing cage into the angular contact roller bearing, are initially deformed elastically in the direction of the cage webs until the free ends thereof latch in behind the rim on the outer bearing ring as the bearing cage is inserted from the large diameter side of the taper rollers. As a result, the bearing cage, which has hitherto been fixed in position only in one axial direction by the contact of the bearing cage with one of the ends of the roller bearing elements, is also fixed in position in the other axial direction. Here too, however, it should be noted that the use of a prong-type cage as a bearing cage is not restricted to this type of cage since it is also possible to construct the bearing cage as a two-part riveted sheet-metal cage.

It is furthermore advantageous to insert two elastomer sealing washers with metal reinforcement into encircling fastening grooves in the inner peripheral surface of the outer bearing ring axially on both sides of the roller bearing elements and thus to seal off the angular contact roller bearing from contamination from the outside and from the escape of any lubricant introduced into the bearing interior. This design, which is known per se from other types of rolling bearing, is notable because, in the case of the angular contact roller bearings described at the outset as the closest prior art, the absence of suitable fastening surfaces and suitable sealing surfaces for such elastomer sealing washers does not allow such sealing. By virtue of the flat design of the outer peripheral surface of the inner bearing ring and of the inner peripheral surface of the outer bearing ring, however, the necessary fastening and sealing surfaces are available in the angular contact roller bearing designed in accordance with the invention.

According to the invention, the stated object is achieved by a method for assembling an angular contact roller bearing, which is distinguished by the fact that the angular contact roller bearing is assembled by an eccentric-pivoting assembly method derived from the eccentric assembly method known for deep groove ball bearings.

Here, in a first step of this eccentric-pivoting assembly method, the outer bearing ring is placed in a receptacle in an at least approximately vertical position with its rimless end in advance and is made slightly oval within its elastic limit at its outer peripheral surface by deformation force application at a 12 o'clock line toward a six o'clock line on its outer peripheral surface.

After this, in a second step, the roller bearing elements are introduced into the race of the outer bearing ring with their larger ends in advance from the rimless end of the outer bearing ring, either individually or as a roller set already prefixed in a horseshoe shape in an auxiliary device.

As a third step, the inner bearing ring is then fed to the outer bearing ring in an automatic sliding movement, with its rimless end resting on a sloping plane, in such a way that it strikes the running surfaces of two roller bearing elements at two impact points by two opposite points of its race.

In a fourth step, a centrifugal force resulting from the acceleration of the inner bearing ring on a sloping plane then causes the inner bearing ring to pivot about a horizontal axis, formed between its impact points on the roller bearing elements, into the outer bearing ring, into a position perpendicular to the latter, in which the rim of the inner bearing ring rests against the smaller ends of the roller bearing elements, at least in some section or sections.

In a fifth step, the inner bearing ring is then moved into a coaxial position with respect to the outer bearing ring, and the roller bearing elements are distributed uniformly around the circumference in their races in the bearing rings, with the ovalization of the outer bearing ring being canceled.

In a sixth step, the bearing cage, which is designed as a prong-type cage, is introduced with its cage webs between the roller bearing elements, either from the side on which the smaller ends of the latter are situated, and is latched on the inner surface of the rim on the inner bearing ring, or, from the side on which the larger ends of the latter are situated, and is latched on the inner surface of the rim on the outer bearing ring.

As the conclusion of the eccentric assembly method according to the invention, in a final step, the bearing interior is then filled with lubricant, and the two elastomer sealing washers are inserted into the encircling fastening grooves in the inner peripheral surface of the outer bearing ring.

Finally, the stated object is also achieved by a device for carrying out the described eccentric-pivoting assembly method.

Accordingly, it is provided that the assembly device should essentially comprise a vertical holding part for retaining the outer bearing ring and for the filling thereof with the roller bearing elements, and a ramp part, arranged opposite and in a manner sloping relative to the holding part, for feeding the inner bearing ring to the outer bearing ring.

In a specific embodiment, the holding part preferably has an L-shaped profile cross section with a horizontal or almost horizontal leg and a vertical or almost vertical leg.

The assembly device designed in accordance with the invention is furthermore characterized in that the surface of the horizontal leg is formed with a concave recess extending to the vertical leg and intended to receive an upright loose holding ring for the outer bearing ring, and in that the vertical leg is designed with a circular aperture of at least approximately the size of the inside diameter of the outer bearing ring, through which the roller bearing elements can be introduced into the race of the outer bearing ring.

It is furthermore an expedient development of the assembly device according to the invention if two stop webs, which are arranged with an offset of approximately 190° to one another and project into the loose holding ring and between which the roller set fed to the outer bearing ring can be fixed in position in said bearing ring, are secured in the aperture of the vertical leg.

Another feature of the assembly device according to the invention is that a device for producing a vertical pressure force for the ovalization of the outer bearing ring is secured on the free end of the vertical leg, at the level of the 12 o'clock line of the peripheral surface of the loose holding ring. A sleeve which is formed with an internal thread and in which an adjusting screw is rotatably arranged has proven particularly suitable here, for example.

Finally, it is provided that the ramp part has a sloping flat slideway having two lateral guide rims, the spacing of which relative to one another corresponds approximately to the outside diameter of the inner bearing ring. This has proven advantageous for enabling the inner bearing ring to slide accurately into the inside diameter of the outer bearing ring. In this case, that end of the slideway which is adjacent to the holding ring is secured on two bearing pedestals, which can be fixed on the surface of the horizontal leg of the holding part by a pin joint in such a way that the slideway can be removed from the holding part together with these bearing pedestals.

In summary, the angular contact roller bearing assembled in accordance with the invention has the advantage over the angular contact roller bearing known from the prior art that, despite the maximum rolling element filling level of about 60% that can be achieved with the eccentric-pivoting assembly method, it has a higher load capacity than a single-row deep groove ball bearing assembled in a similar way since the roller bearing elements used are no longer in point contact with their races, as in the case of bearing balls, but are in linear contact. As regards the achievable load capacity, an angular contact roller bearing designed in accordance with the invention can be classified as a completely new type of bearing [e.g. ARU Series (Angular Roller Unit) 207=40 kN], coming approximately in the middle between the load capacity of a single-row deep groove ball bearing [e.g. Series 6207=25.5 kN] and the load capacity of a single-row cylindrical roller bearing [e.g. NUP Series 207E=56 kN]. Moreover, the fact that the rims are formed in one piece with the bearing rings means that separate rim disks are no longer necessary, and therefore the angular contact roller bearing assembled in accordance with the invention is distinguished overall by low assembly effort and hence low overall costs for bearing manufacture.

BRIEF DESCRIPTION OF THE DRAWINGS

A preferred embodiment of an angular contact roller bearing and a method for the assembly thereof and a device for carrying out this method are explained in greater detail below with reference to the attached drawings, in which.

DETAILED DESCRIPTION

Figure 1:
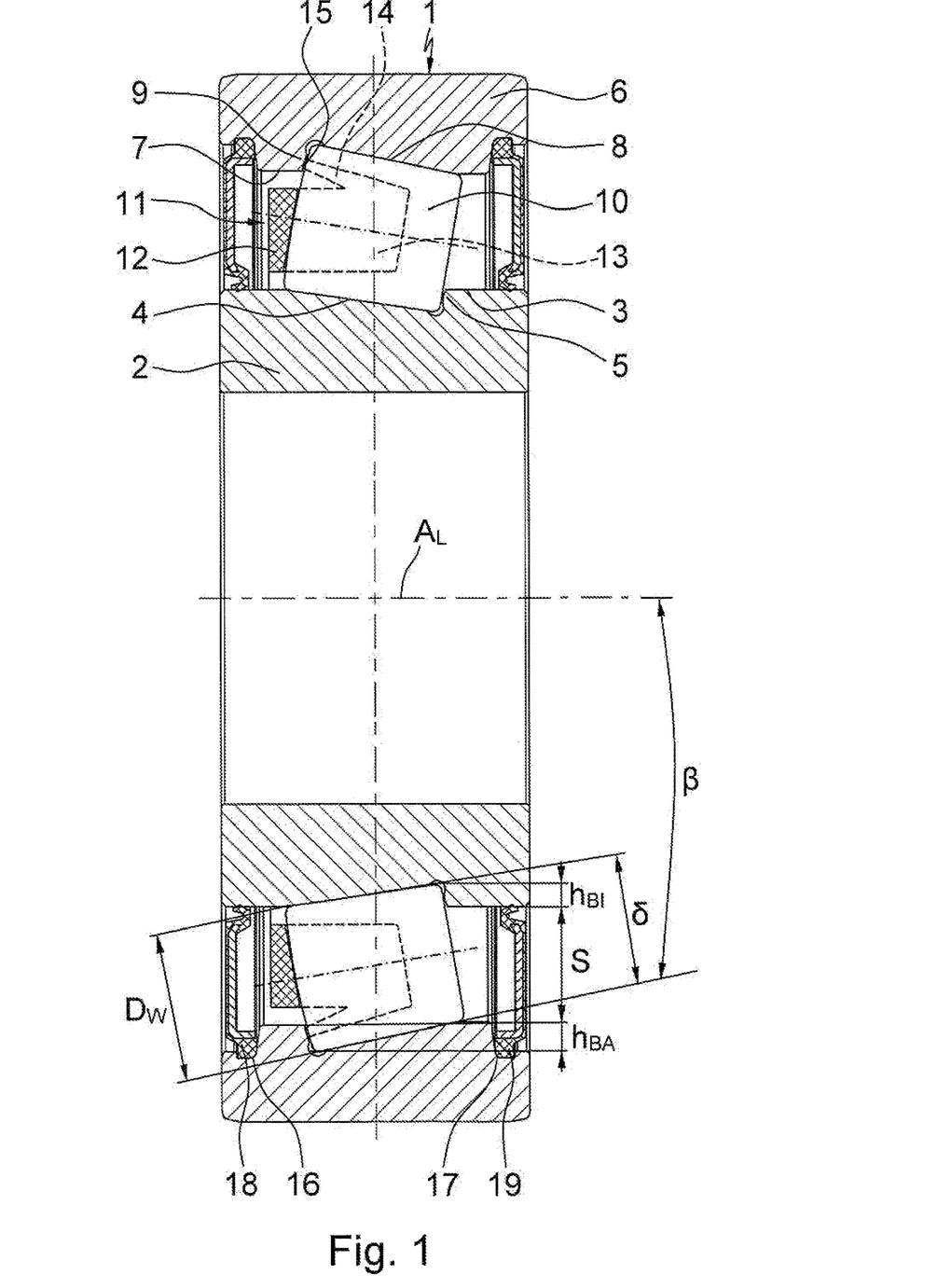
FIG. 1 shows an enlarged illustration of a cross section through a single-row angular contact roller bearing having rims formed in one piece with the bearing rings.

FIG. 1 illustrates a cross section of a single-row angular contact roller bearing 1, which is suitable, for example, as a replacement for the hitherto used deep groove ball bearing for supporting the crankshaft in motor-vehicle internal combustion engines. As is clearly apparent, this angular contact roller bearing 1 comprises an inner bearing ring 2 having an inner race 4 arranged on the outer peripheral surface 3 thereof and inclined with respect to the bearing rotation axis $A_L$, which is delimited at its smallest diameter by a rim 5, and an outer bearing ring 6 having an outer race 8 arranged on the inner peripheral surface 7 thereof and likewise inclined with respect to the bearing rotation axis $A_L$, which is delimited at its largest diameter by a rim 9. A multiplicity of roller bearing elements 10, which roll on the races 4, 8 thereof and are held at uniform distances from one another in the circumferential direction by a bearing cage 11, are furthermore arranged between the bearing rings 2, 6.

It can furthermore be seen in FIG. 1 that, in each case outside the races 4, 8, the outer peripheral surface 3 of the inner bearing ring 2 and the inner peripheral surface 7 of the outer bearing ring 6 are of cylindrical design, extending coaxially with respect to the bearing rotation axis $A_L$, at least in some section or sections, and the races 4, 8 of both bearing rings 2, 6 are in each case machined conically into the peripheral surfaces 3, 7. As a result, the rims 5, 9 which are produced in this case and in each case delimit the races 4, 8 on one side are in each case formed in one piece with the bearing rings 2, 6.

It can likewise be seen from FIG. 1 that the roller bearing elements 10 are designed as taper rollers, which have a taper angle δ of preferably 2° and roll on their races 4, 8 at an enveloping circle angle β of preferably 6°. The gap S between the outer peripheral surface 3 of the inner bearing ring 2 and the inner peripheral surface 7 of the outer bearing ring 6 is furthermore dimensioned in such a way that twice the dimension thereof is greater than the maximum diameter $D_W$ of the roller bearing elements 10 in order to enable the roller bearing elements 10 to be inserted into the radial rolling bearing 1 by the assembly method described in greater detail below. In addition, both the rim 5 delimiting the race 4 in the inner bearing ring 2 and the rim 9 delimiting the race 8 in the outer bearing ring 6 have an equal minimum height $h_{BI}$, $h_{BA}$ of about 20% of the maximum diameter $D_W$ of the roller bearing elements 10 to enable high axial forces which occur during the operation of the bearing to be absorbed in one direction with a minimum possible rim friction.

It can furthermore be seen in FIG. 1 that the bearing cage 11 is preferably formed by a prong-type cage, which can be inserted into the radial rolling bearing 1 after the installation of the roller bearing elements 10. In this case, the bearing cage 11, which comprises a cage ring 12 and a multiplicity of axial cage webs 13, has on its cage webs 13 (concealed in the illustration) a plurality of latching webs 14 (likewise concealed in the illustration), which are uniformly distributed over the circumference, which extend obliquely to the central axis $A_L$ of the bearing and by which the bearing cage 11 can be fixed axially in position on the inner surface 15 of the rim 9 on the outer bearing ring 6.

Finally, it is also possible to see in FIG. 1 that the radial rolling bearing 1 is sealed off from contamination from the outside and from the escape of any lubricant introduced into the bearing interior 20 by two elastomer sealing washers 18, 19 with metal reinforcement inserted into encircling fastening grooves 16, 17 in the inner peripheral surface 7 of the outer bearing ring 6 axially on both sides of the roller bearing elements 10.

Figure 2A:
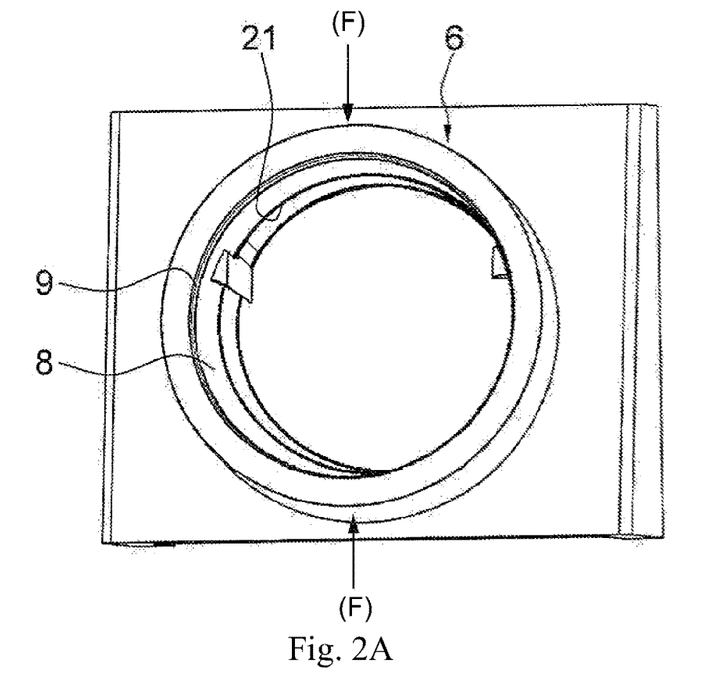
FIGS. 2A, 2B show a three-dimensional illustration of the first step of the assembly method according to the invention in a plan view and a sectioned view.
Figure 2B:
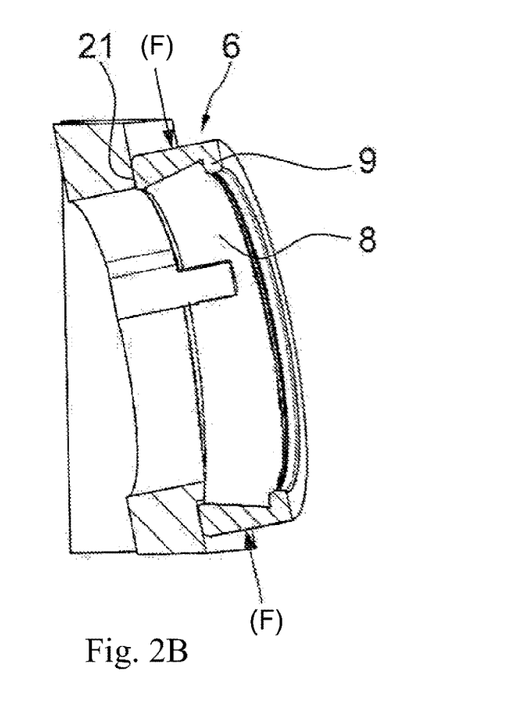

In FIGS. 2A to 7B, the individual steps of an assembly method for the angular contact roller bearing 1 according to the invention are furthermore illustrated schematically. This assembly method is essentially a modified eccentric assembly method known per se as an assembly method for deep groove ball bearings, in which, as can be seen in FIGS. 2A and 2B, in a first step, the outer bearing ring 6 is placed in a receptacle in an at least approximately vertical position with its rimless end 21 in advance and is made slightly oval within its elastic limit at its outer peripheral surface 22 by deformation force (F) application at a 12 o'clock line indicated in the drawing by an arrow toward a 6 o'clock line, likewise indicated by an arrow, on its outer peripheral surface 22.

Figure 3A:
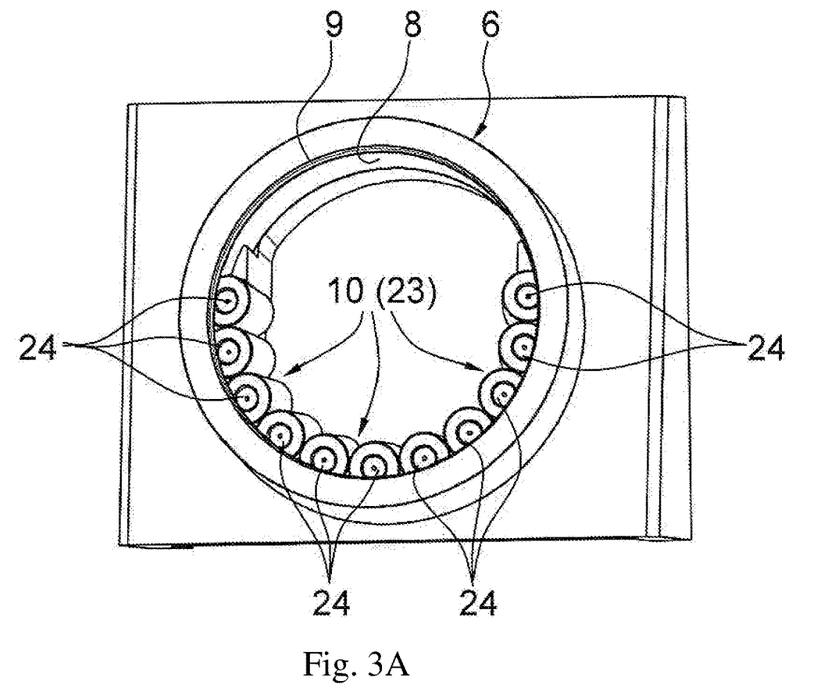
FIGS. 3A, 3B show a three-dimensional illustration of the second step of the assembly method according to the invention in a plan view and a sectioned view.
Figure 3B:
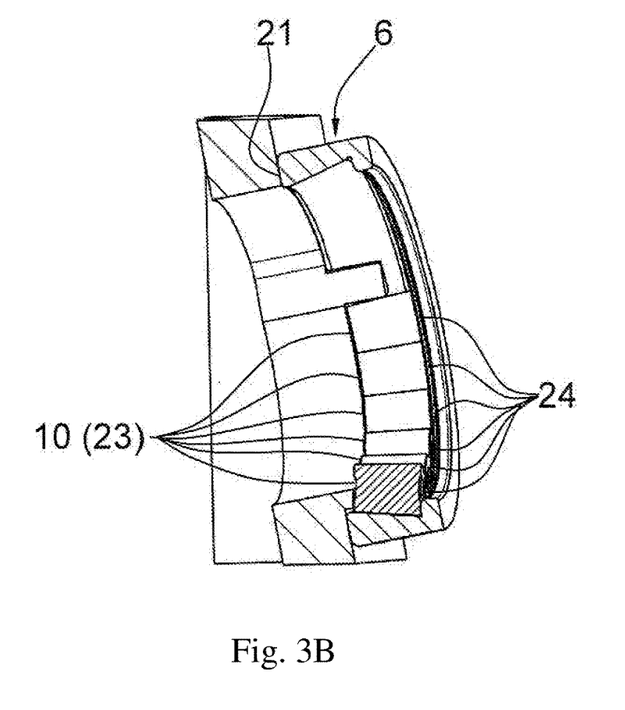

After this, in a second step depicted in FIGS. 3A and 3B, the roller bearing elements 10 are introduced into the race 8 of the outer bearing ring 6 with their larger ends 24 in advance from the rimless end 21 of the outer bearing ring 6, either individually or as a roller set 23 already prefixed in a horseshoe shape in an auxiliary device.

Figure 4A:
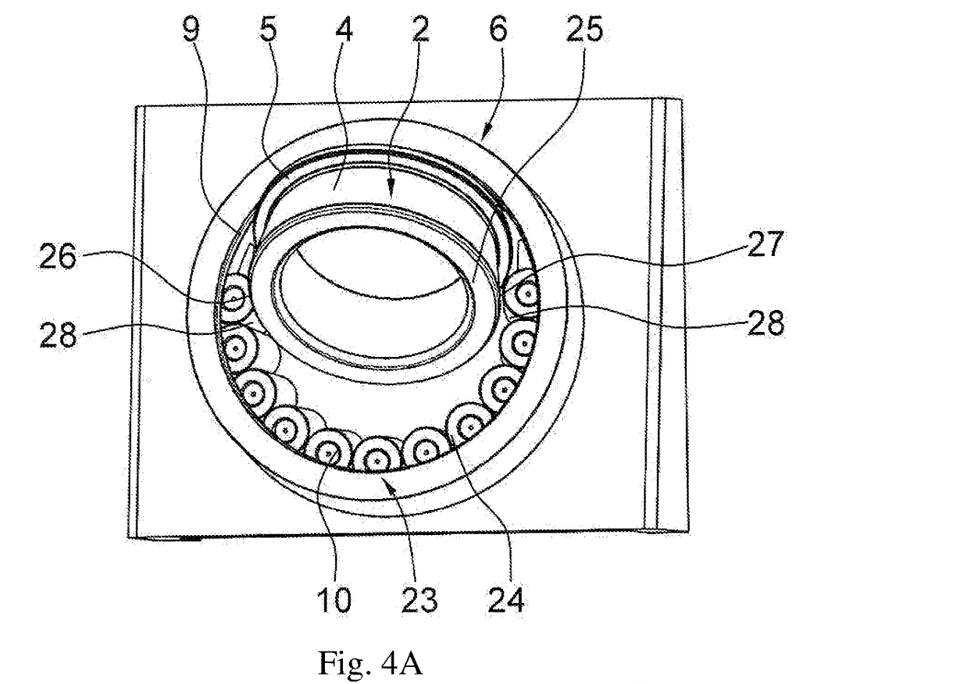
FIGS. 4A, 4B show a three-dimensional illustration of the third step of the assembly method according to the invention in a plan view and a sectioned view.
Figure 4B:
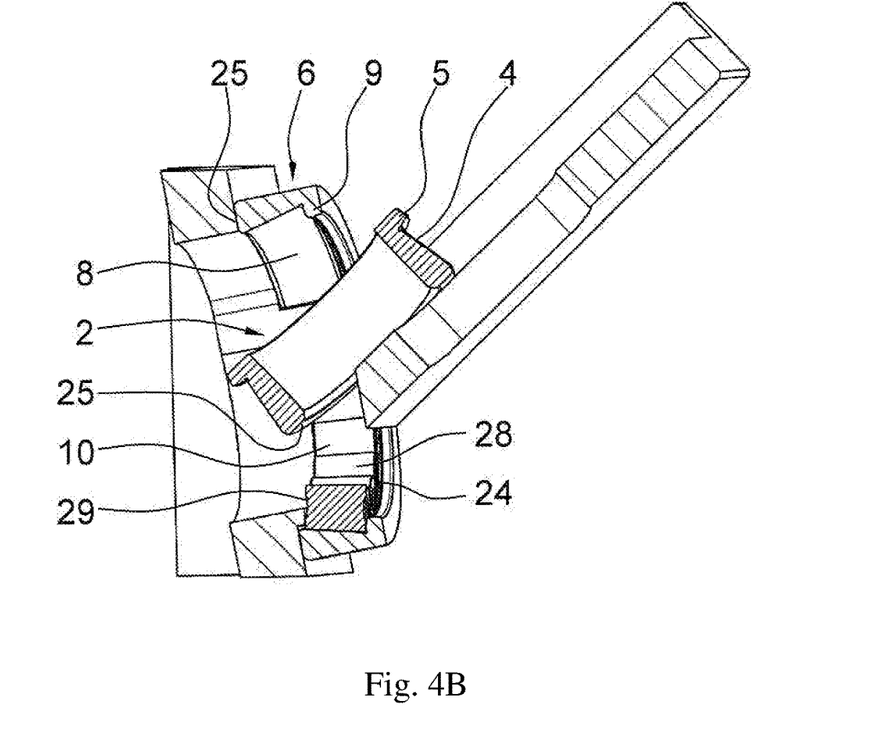

In a third step, which can be seen from FIGS. 4A and 4B, the inner bearing ring 2 is then fed to the outer bearing ring 6 in an automatic sliding movement, with its rimless end 25 resting on a sloping plane, in such a way that it strikes the running surfaces 28 of two roller bearing elements 10 at two impact points 26, 27 by two opposite points of its race 4.

Figure 5A:
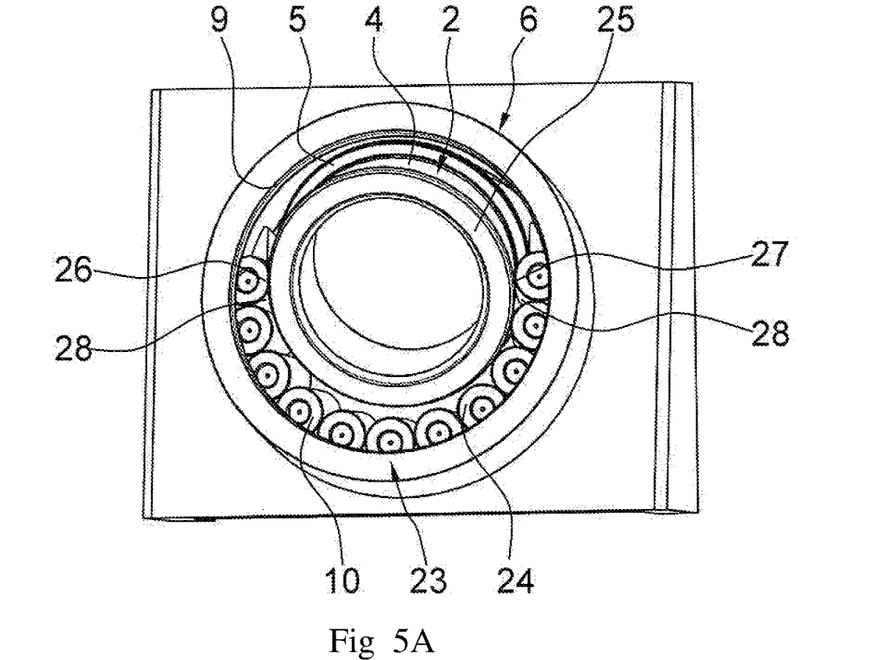
FIGS. 5A, 5B show a three-dimensional illustration of the fourth step of the assembly method according to the invention in a plan view and a sectioned view.
Figure 5B:
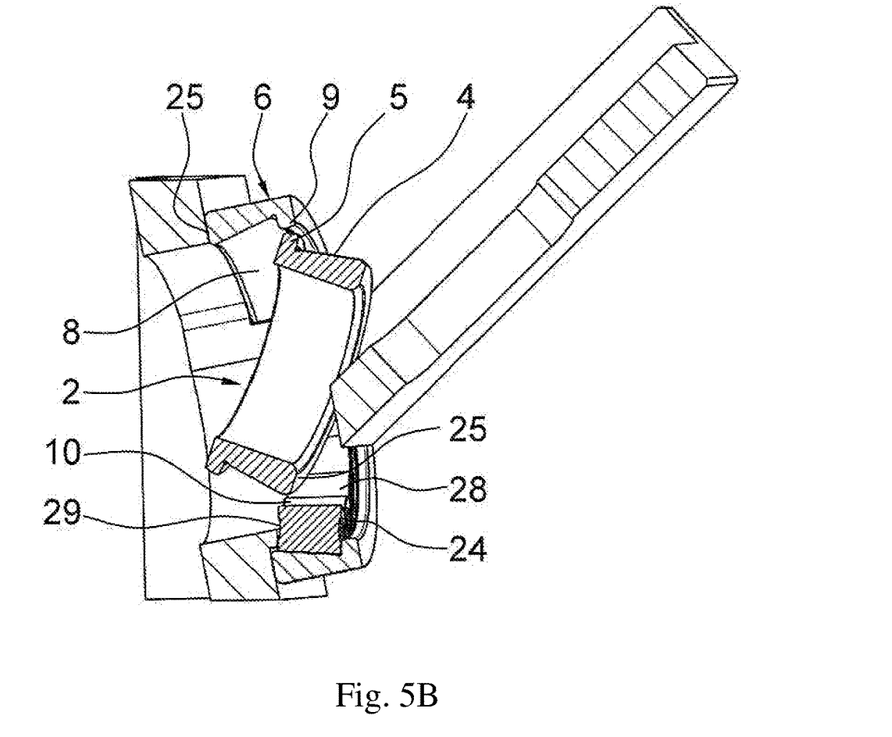

After this, as a fourth step, which is shown in FIGS. 5A and 5B, a centrifugal force resulting from the acceleration of the inner bearing ring on a sloping plane causes the inner bearing ring 2 to pivot about a horizontal axis, formed between its impact points 26, 27 on the roller bearing elements 10, into the outer bearing ring 6, into a position perpendicular to the latter, in which the rim 5 of the inner bearing ring 2 rests against the smaller ends 29 of the roller bearing elements 10, at least in some section or sections.

Figure 6A:
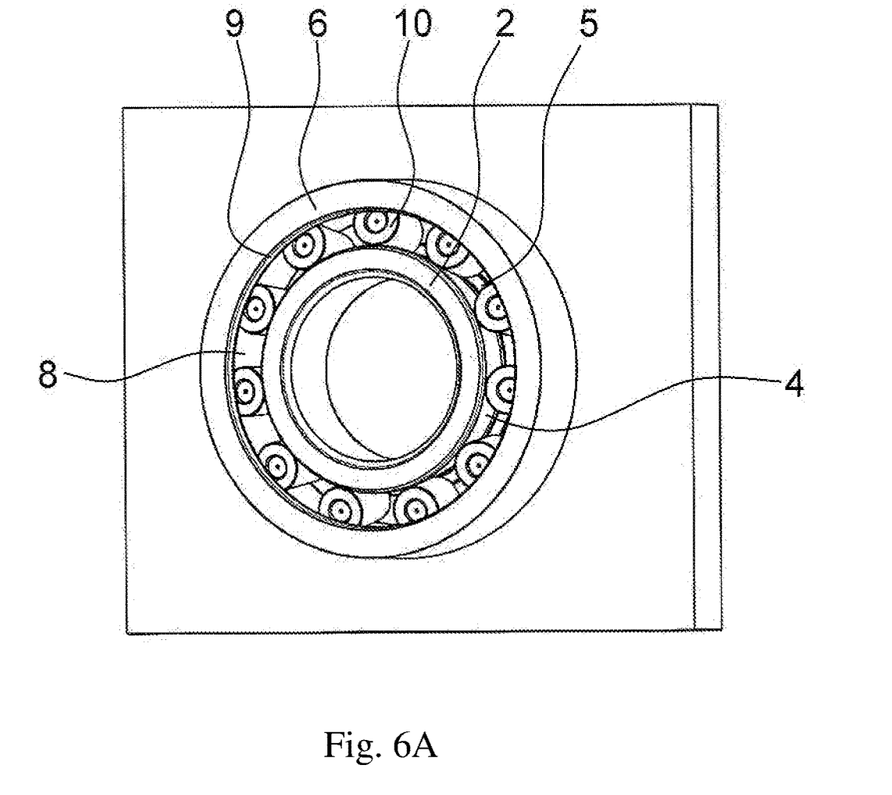
FIGS. 6A, 6B show a three-dimensional illustration of the fifth step of the assembly method according to the invention in a plan view and a sectioned view.
Figure 6B:
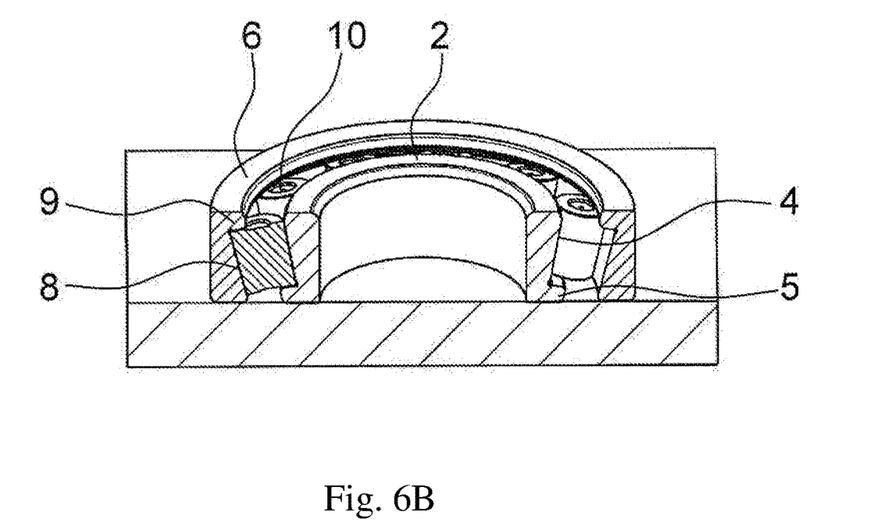

In a fifth step, as can be seen from FIGS. 6A and 6B, the inner bearing ring 2 is then moved into a coaxial position with respect to the outer bearing ring 3 in order to arrange the roller bearing elements 10 in a manner distributed uniformly around the circumference in their races 4, 8 in the bearing rings 2, 6, with the ovalization of the outer bearing ring 3 being canceled.

Figure 7A:
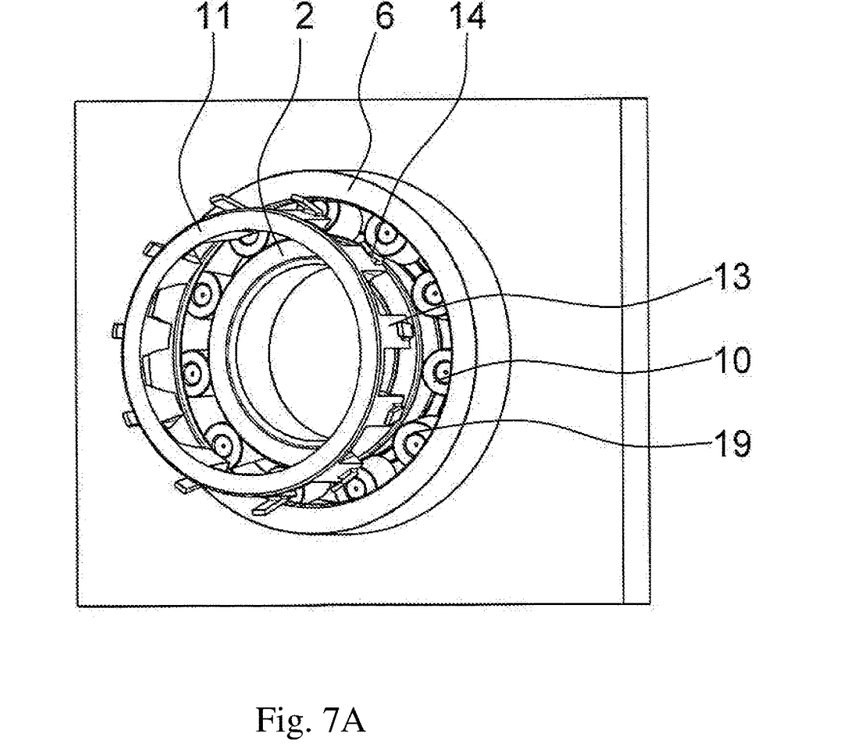
FIGS. 7A, 7B show a three-dimensional illustration of the sixth step of the assembly method according to the invention in a plan view and a sectioned view.
Figure 7B:
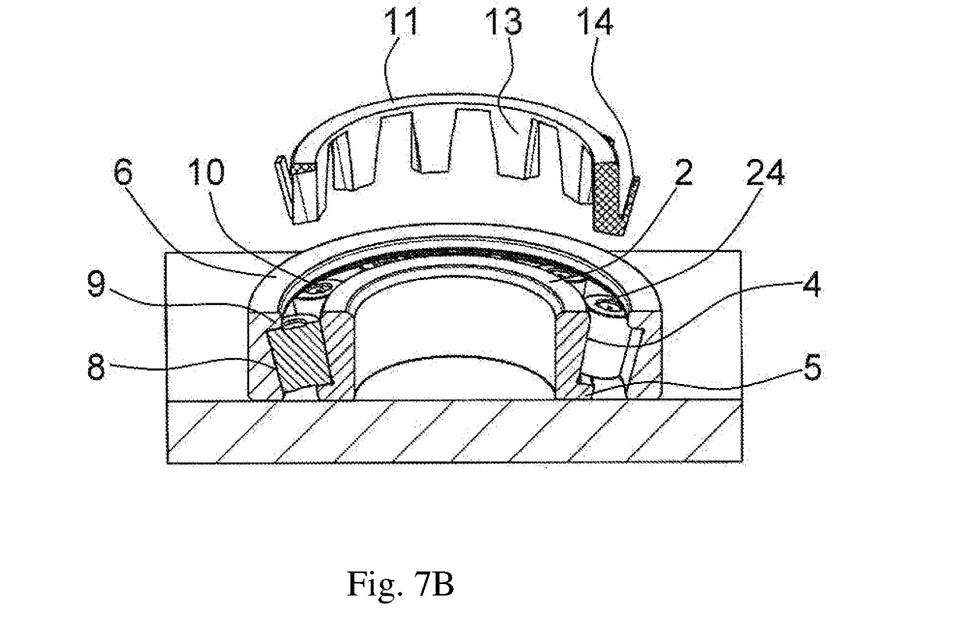

After this, in a sixth step, as depicted in FIGS. 7A and 7B, the bearing cage 11 is introduced by its cage webs 13 between the roller bearing elements 10, from the side on which the larger ends of the latter are situated, and, as shown in FIG. 1, is latched by its latching webs 14 on the inner surface 15 of the rim 9 on the outer bearing ring 6. A variant of this, which is not illustrated in the drawings for reasons of simplification, would be to introduce the bearing cage 11, which is designed as a prong-type cage, by its cage webs 13 between the roller bearing elements 10, from the side on which the smaller ends of the latter are situated, and to latch it by latching webs on the inner surface of the rim 5 on the inner bearing ring 2.

Finally, the bearing interior 20 is then filled with lubricant, and the two elastomer sealing washers 18, 19 are inserted into the encircling fastening grooves 16, 17 in the inner peripheral surface 7 of the outer bearing ring 6 in the manner which is likewise illustrated in FIG. 1.

Figure 8:
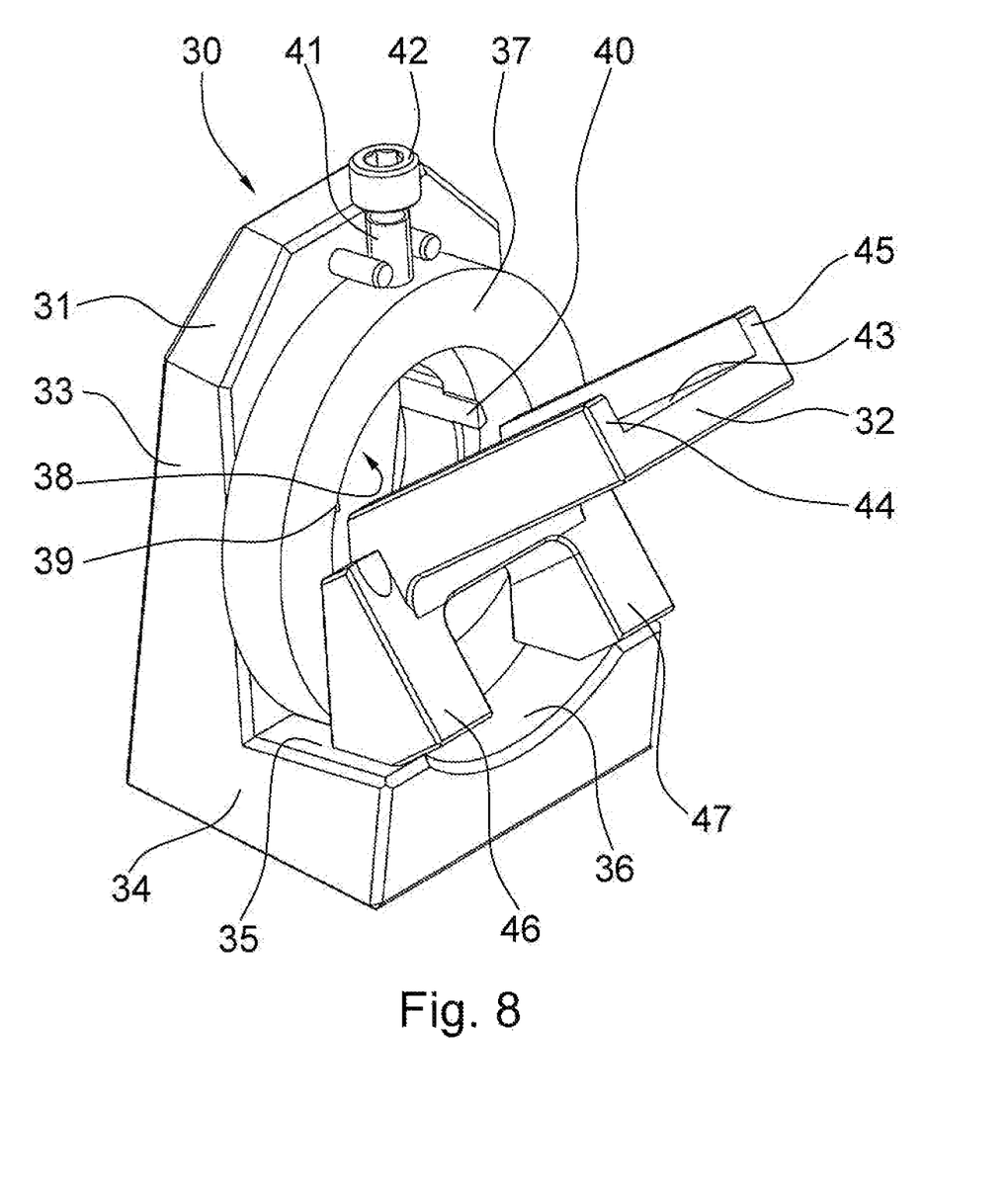
FIG. 8 shows a three-dimensional illustration of a device for carrying out the assembly method according to the invention in a plan view.

Finally, in FIG. 8, the assembly device 30 for carrying out the eccentric-pivoting assembly method according to the invention is illustrated. It is clearly apparent that this assembly device 30 essentially comprises a vertical holding part 31 for retaining the outer bearing ring 6 and for the filling thereof with the roller bearing elements 10, and a ramp part 32, arranged opposite and in a manner sloping relative to the holding part 31, via which the inner bearing ring 2 is fed to the outer bearing ring 6.

It can furthermore be seen in FIG. 8 that the holding part 31 has an L-shaped profile cross section with a horizontal or almost horizontal leg 33 and a vertical or almost vertical leg 34. In this case, the surface 35 of the horizontal leg 33 is formed with a concave recess 36 extending to the vertical leg 34 and intended to receive an upright loose holding ring 37 for the outer bearing ring 6, while the vertical leg 34 is designed with a circular aperture 38 of at least approximately the size of the inside diameter of the outer bearing ring 6, through which the roller bearing elements 10 can be introduced into the race 8 of the outer bearing ring 6.

It can furthermore be seen from FIG. 8 that two stop webs 39, 40, which are arranged with an offset of approximately 190° to one another and project into the loose holding ring 37 and between which the roller set 23 fed to the outer bearing ring 6 can be fixed in position in said bearing ring, are secured in the aperture 38 of the vertical leg 34.

It can likewise be clearly seen in FIG. 8 that a device for producing a vertical pressure force for the ovalization of the outer bearing ring 6, which is designed as a sleeve 41 which is formed with an internal thread and in which an adjusting screw 42 is rotatably arranged, is secured on the free end of the vertical leg 34, at the level of the 12 o'clock line of the peripheral surface of the loose holding ring 37.

Finally, it is apparent from FIG. 8 that the ramp part 32 of the assembly device 30 has a sloping flat slideway 43 having two lateral guide rims 44, 45, the spacing of which relative to one another corresponds approximately to the outside diameter of the inner bearing ring 2. In this case, the end of the slideway 43 which is adjacent to the holding ring is secured on two bearing pedestals 46, 47, which can be fixed on the surface 35 of the horizontal leg 33 of the holding part 31 by a pin joint in such a way that the slideway 43 can be removed from the holding part 31 together with these bearing pedestals 46, 47.

LIST OF REFERENCE SIGNS 1 angular contact roller bearing
2 inner bearing ring
3 outer peripheral surface of 2
4 inner race in 2
5 rim on 4
6 outer bearing ring
7 inner peripheral surface of 6
8 outer race in 6
9 rim on 8
10 roller bearing element
11 bearing cage
12 cage ring of 11
13 cage webs on 12
14 latching webs on 13
15 inner surface of 9
16 fastening groove in 7
17 fastening groove in 7
18 elastomer sealing washer
19 elastomer sealing washer
20 bearing interior
21 rimless end of 6
22 outer peripheral surface of 6
23 roller set
24 larger ends of 10
25 rimless end of 2
26 impact point on 28
27 impact point on 28
28 running surface of 10
29 smaller end of 10
30 assembly device
31 holding part of 30
32 ramp part of 30
33 horizontal leg of 31
34 vertical leg of 31
35 surface of 33
36 concave recess in 35
37 holding ring of 31
38 aperture in 34
39 stop web in 38
40 stop web in 38
41 sleeve on 34
42 adjusting screw in 41
43 slideway of 32
44 guide rim on 43
45 guide rim on 43
46 bearing pedestal on 43
47 bearing pedestal on 43
$A_L$ bearing rotation axis
$\delta$ taper angle
$\beta$ enveloping circle angle
S gap between 3 and 7
$D_W$ largest diameter of 10
$h_{BI}$ rim height on 2
$h_{BA}$ rim height on 6

The invention claimed is:

1. A method for assembling an angular contact roller bearing, said angular contact roller bearing comprising:
an inner bearing ring having an inner race on an outer peripheral surface and a rim delimiting said inner race at a smallest diameter thereof,
an outer bearing ring having an outer race on an inner peripheral surface and a rim delimiting said outer race at a largest diameter thereof, and
a plurality of roller bearing elements arranged between the inner and outer bearing rings wherein at least a portion of both the outer peripheral surface of the inner bearing ring and the inner peripheral surface of the outer bearing ring are cylindrical and extend coaxially with respect to a bearing rotation axis in regions away from the respective inner and outer races, the method comprising:
a first step comprising applying diametrically opposed deformation forces on the outer peripheral surface of the outer bearing ring such that the outer bearing ring is temporarily deformed to have an oval profile;
a second step comprising positioning the plurality of roller bearing elements on the race of the outer bearing ring; and
a third step comprising sliding the inner bearing ring partially inside of the outer bearing ring such that a rimless end of the inner bearing ring contacts at least one running surface of the plurality of roller bearing elements.

2. The method as claimed in claim 1, wherein the first step further comprises placing the outer bearing ring in a receptacle in an at least approximately vertical position with a rimless end in advance and the diametrically opposed deformation forces are applied at a 12 o'clock line toward a 6 o'clock line on the outer peripheral surface of the outer bearing ring.

3. The method as claimed in claim 2, wherein the second step further comprises introducing the plurality of roller bearing elements into the race of the outer bearing ring with larger ends of the plurality of roller bearing elements in advance from the rimless end of the outer bearing ring, either individually or as a roller set prefixed in a horseshoe shape in an auxiliary device.

4. The method as claimed in claim 3, wherein the third step further comprises resting the rimless end of the inner bearing ring on a sloping plane, such that the rimless end of the inner bearing contacts the running surfaces of two of the plurality of roller bearing elements at two impact points at two opposite points of the inner race.

5. The method as claimed in claim 4, further comprising, in a fourth step, a centrifugal force resulting from acceleration of the inner bearing ring on the sloping plane pivoting the inner bearing ring about a horizontal axis, formed between the impact points on the plurality of roller bearing elements, into the outer bearing ring, into a position perpendicular to the outer bearing ring, in which the rim of the inner bearing ring rests against smaller ends of the plurality of roller bearing elements, at least in some section or sections.

6. The method as claimed in claim 5, further comprising, in a fifth step, moving the inner bearing ring into a coaxial position with respect to the outer bearing ring, and distributing the plurality of roller bearing elements-uniformly around a circumference in the inner and outer races in the bearing rings, with ovalization of the outer bearing ring being canceled.

7. The method as claimed in claim 6, wherein the angular contact roller bearing further comprises a bearing cage formed as a prong-type bearing cage, the method further comprising, in a sixth step, introducing the bearing cage by cage webs thereof between the plurality of roller bearing elements, from a side on which the smaller ends of the plurality of roller bearing elements are situated, and latching the bearing cage using latching webs thereof engaging on an inner surface of the rim on the inner bearing ring.

8. The method as claimed in claim 6, wherein the angular contact roller bearing further comprises a bearing cage formed as a prong-type bearing cage, the method further comprising, in a sixth step, introducing the bearing cage by cage webs thereof between the plurality of roller bearing elements, from a side on which the larger ends of the plurality of roller bearing elements are situated, and latching the bearing cage using latching webs thereof on an inner surface of the rim on the outer bearing ring.

9. The method as claimed in claim 8, wherein encircling fastening grooves are located in the inner peripheral surface of the outer bearing ring, the method further comprising, in a concluding step, filling a bearing interior with lubricant, and inserting two elastomer sealing washers into the encircling fastening grooves.

10. The method as claimed in claim 8, wherein encircling fastening grooves are located in the inner peripheral surface of the outer bearing ring, the method further comprising, in a concluding step, filling a bearing interior with lubricant, and inserting two elastomer sealing washers into the encircling fastening grooves.

11. An assembly device for carrying out the method as claimed in claim 1, the assembly device comprising a vertical holding part for retaining and filling the outer bearing ring with the plurality of roller bearing elements, and a ramp part, arranged opposite relative to the holding part and including a slope for feeding the inner bearing ring to the outer bearing ring.

12. The assembly device as claimed in claim 11, wherein the holding part has an L-shaped profile cross section with a horizontal leg and a vertical leg.

13. The assembly device as claimed in claim 12, wherein a surface of the horizontal leg is formed with a concave recess extending to the vertical leg and is adapted to receive an upright loose holding ring for the outer bearing ring.

14. The assembly device as claimed in claim 13, wherein the vertical leg includes a circular aperture of at least approximately a same size as the inside diameter of the outer bearing ring, through which the plurality of roller bearing elements are introducable into the race of the outer bearing ring.

15. The assembly device as claimed in claim 14, further comprising two stop webs arranged with an offset of approximately 190° to one another that project into the loose holding ring and between which a roller set fed to the outer bearing ring is fixable in position in said bearing ring, and is secured in the aperture of the vertical leg.

16. The assembly device as claimed in claim 15, further comprising a device for producing a vertical pressure force for ovalization of the outer bearing ring, including a sleeve formed with an internal thread and in which an adjusting screw is rotatably arranged, secured on a free end of the vertical leg, at a plane of a 12 o'clock line of a peripheral surface of the loose holding ring.

17. The assembly device as claimed in claim 16, wherein the ramp part has a sloping flat slideway having two lateral guide rims, and a spacing of the two lateral guide rims relative to one another corresponds to an outside diameter of the inner bearing ring.

18. The assembly device as claimed in claim 17, wherein an end of the slideway which is adjacent to the holding ring is secured on two bearing pedestals, and the slideway is removably fixed on the surface of the horizontal leg of the holding part via said bearing pedestals.

* * * * *